US010891667B2

(12) United States Patent
Srinivasan et al.

(10) Patent No.: US 10,891,667 B2
(45) Date of Patent: Jan. 12, 2021

(54) BUNDLING ONLINE CONTENT FRAGMENTS FOR PRESENTATION BASED ON CONTENT-SPECIFIC METRICS AND INTER-CONTENT CONSTRAINTS

(71) Applicant: Adobe Inc., San Jose, CA (US)

(72) Inventors: Balaji Vasan Srinivasan, Bangalore (IN); Shiv Kumar Saini, Bangalore (IN); Kundan Krishna, Bangalore (IN); Anandhavelu Natarajan, Bangalore (IN); Tanya Goyal, Bangalore (IN); Pranav Ravindra Maneriker, Karnataka (IN); Cedric Huesler, San Francisco, CA (US)

(73) Assignee: ADOBE INC., San Jose, CA (US)

( * ) Notice: Subject to any disclaimer, the term of this patent is extended or adjusted under 35 U.S.C. 154(b) by 390 days.

(21) Appl. No.: 15/687,658

(22) Filed: Aug. 28, 2017

(65) Prior Publication Data
US 2018/0276725 A1    Sep. 27, 2018

(30) Foreign Application Priority Data

Mar. 21, 2017 (IN) .............................. 201711009821

(51) Int. Cl.
*G06Q 30/06* (2012.01)
*G06F 16/957* (2019.01)
(Continued)

(52) U.S. Cl.
CPC ....... *G06Q 30/0601* (2013.01); *G06F 16/957* (2019.01); *G06F 16/9577* (2019.01); *G06F 17/10* (2013.01); *G06Q 30/0204* (2013.01)

(58) Field of Classification Search
CPC ........ G06F 16/957–9577; G06F 17/10; G06Q 30/0204; G06Q 30/06–0645; G06Q 30/08; G06Q 50/01
See application file for complete search history.

(56) References Cited

U.S. PATENT DOCUMENTS 5,515,490 A * 5/1996 Buchanan ........ H04N 21/23412
715/209
7,174,305 B2 * 2/2007 Carruthers ............. G06Q 30/02
705/14.52
(Continued)

OTHER PUBLICATIONS

Zhu, Tao, et al., "Bundle Recommendation in eCommerce", Proceedings of the 37th International ACM SIGIR Conference on Research & Development, ACM, Jul. 2014, 10 pages.
(Continued)

*Primary Examiner* — Adam L Levine
(74) *Attorney, Agent, or Firm* — Kilpatrick Townsend & Stockton LLP

(57) ABSTRACT

Embodiments are disclosed for bundling and arranging online content fragments for presentation based on content-specific metrics and inter-content constraints. For example, a content management application accesses candidate content fragments, a content-specific metric, and an inter-content constraint. The content management application computes minimum and maximum contribution values for the candidate content fragments. The content management application selects, based on the computed minimum and maximum contribution values, a subset of the candidate content fragments. The content management application applies, subject to the inter-content constraint, a bundle-selection function to the selected candidate content fragments and thereby identifies a bundle of online content fragments. The content management application outputs the identified bundle of online content fragments for presentation via an online service.

20 Claims, 10 Drawing Sheets

(51) Int. Cl.
*G06F 17/10* (2006.01)
*G06Q 30/02* (2012.01)

(56) References Cited

U.S. PATENT DOCUMENTS

| | | | | |
|---|---|---|---|---|
| 7,890,857 | B1* | 2/2011 | Jouppi | G06Q 30/02 715/243 |
| 8,112,308 | B1* | 2/2012 | Ho | G06Q 30/02 705/14.41 |
| 9,406,093 | B2* | 8/2016 | Chedeau | G06Q 50/01 |
| 9,712,860 | B1* | 7/2017 | Waggoner | H04N 21/2662 |
| 2015/0032805 | A1* | 1/2015 | Huang | H04L 67/2847 709/203 |

OTHER PUBLICATIONS

Jansen, Klaus, et al., "On Rectangle Packing. Maximizing Benefits", SODA '04 Proceedings of the fifteenth annual ACM-SIAM symposium on Discrete algorithms, ACM, Jan. 2004, 10 pages.

Carbonell, Jaime, et al., "The Use of MMR, Diversity-Based Reranking for Reordering Documents and Producing Summaries", Proceedings of the 21st Annual International ACM SIGIR Conference on Research and Development in Information Retrieval, ACM, Aug. 1998, 2 pages.

Agarwal, Deepak, et al., "Click Shaping to Optimize Multiple Objectives", KKD '11 Proceedings of the 17th ACM SIGKDD International Conference on Knowledge Discovery and Data Mining, Aug. 2011, 9 pages.

Ash, T. M., "Landing Page Optimization. The Definitive Guide to Testing and Tuning for Conversions", John Wiley & Sons, $2^{nd}$ Edition, Apr. 2012, 10 Pages.

Narahari, Y., "Game Theory and Mechanism Design" IISc Lecture Note Series, vol. 4, Oct. 2012, 17 Pages.

Pardalos, Panos M., et al. "Computational Aspects of a Branch and Bound Algorithm for Quadratic Zero-One Programming" Computing, vol. 45, Issue 2, Jun. 1990, 14 Pages.

Steinberg, A. "A Strip-Packing Algorithm with Absolute Performance Bound 2", SIAM Journal on Computing , vol. 26, Issue 2, 1997, 9 Pages.

* cited by examiner

600

| | | | | |
|---|---|---|---|---|
| 5 Stunning Cakes with Sky-High Fan Reviews (KPI: $43.00) | A Watermelon Cake to Put a Grin on Your Face (KPI: $75.00) | Christmas Coconut Cake Down-Home Comfort (KPI: $67.00) | 9 (Mostly) No-Bake Icebox Cakes (KPI: $71.00) | 5 Gorgeous Cakes That Stripped Down for Spring (KPI: $55.00) |
| Chocolate-Peanut Butter Whoopie Pies Bake-Ahead B... (KPI: $59.00) | 5 Cakes That Will Make Mom Weep with Joy (KPI: $74.00) | Relax, Its Just a Layer Cake (KPI: $56.00) | Red Velvet Everything: 10 Favorites to Eat and Dri... (KPI: $62.00) | These Cute Cat Cakes Are Beyond Sweet (KPI: $70.00) |
| Christmas Cakes and Cupcakes That'll Make You Ignor... (KPI: $60.00) | Beyond Pie: Thanksgiving Cupcakes, Cakes and Cooki... (KPI: $80.00) | Non-Pie Desserts That Will Take the Cake This Than... (KPI: $60.00) | 5 Showstopping Carrot Cakes to Bake for Thanksgivi... (KPI: $47.00) | Satisfy Your Sweet Tooth | Cake Wars | Food Networ... (KPI: $29.00) |

FIG. 6

BUNDLING ONLINE CONTENT FRAGMENTS FOR PRESENTATION BASED ON CONTENT-SPECIFIC METRICS AND INTER-CONTENT CONSTRAINTS

CROSS-REFERENCE TO RELATED APPLICATIONS

This disclosure claims priority to Indian Patent Application No. 201711009821, entitled "BUNDLING ONLINE CONTENT FRAGMENTS FOR PRESENTATION BASED ON CONTENT-SPECIFIC METRICS AND INTER-CONTENT CONSTRAINTS," filed Mar. 21, 2017, the entirety of which is hereby incorporated by reference herein.

TECHNICAL FIELD

This disclosure relates generally to computer-implemented methods and systems for optimizing the presentation of online content, and more particularly relates to bundling and arranging (e.g., obtaining, preparing, and grouping) online content fragments for presentation based on content-specific metrics and inter-content constraints.

COPYRIGHT NOTIFICATION

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Content providers, such as creators and publishers of videos or other media content provided via the Internet, provide access to media content via multiple various online environments and devices (e.g., desktops, mobile devices, wearable devices, etc.). Once content has been created, providers often wish to select and present content in a manner that is customized or otherwise optimized for a user or group of users. This customization improves the quality of the user's online experience.

Selecting and arranging online content to elicit interactions with the content via a data network involves significant manual effort. Currently, a content provider may use a dedicated team that expends significant effort in manually comparing and selecting various online content items for various desired audience segments. For example, a certain content provider (e.g., "Network 1") may wish to create a category webpage for a certain set of online content (e.g., content describing "Holiday Cakes" products) with the goal of maximizing one or more metrics for the online content (e.g., the time that user devices access the online service, the overall ad revenue for the category, etc.). To do so, the content provider will typically use a team of analysts or editors to analyze hundreds of online content items in their repository that could serve this purpose.

Continuing with this example, the team of analysts or editors will manually identify a subset of the different content items that will suit the desired theme and that has worked well towards achieving content-specific metrics (e.g., ad revenue or time spent) in the past. This subset of content is provided to a designer, who arranges this content in a specific template or other layout for delivery. However, due to increases in the amount of digital content and the number of such metrics or constraints that must be optimized for the content selection, these manual processes are intractable, laborious and error prone.

Existing solutions for reducing the manual labor involved in selecting content items present disadvantages. For example, one existing solution for online content delivery is landing page optimization. Landing page optimization involves optimizing the "landing" web page of a website based on a query through which a user device accessed a particular web page. But even the automated analysis provided landing page optimization is based on manually created rules, and therefore involves similar disadvantages as manually selecting content.

Furthermore, the increasing number of platforms on which the content is being consumed increases the difficulty of analyzing the content on each medium and customizing a user experience for particular online channels. Existing web template systems create web pages from content, and web templates are presented in a way that a web engine generates a web page with mapped content. But this process is sub-optimal for rendering the same content on multiple devices.

BRIEF DESCRIPTION OF THE FIGURES

Features, embodiments, and advantages of the present disclosure are better understood when the following Detailed Description is read with reference to the accompanying drawings.

FIG. 6 depicts an example of a set of input content fragments that could be used by the process depicted in FIG. 5, according to certain embodiments of the present disclosure.

SUMMARY

Figure 1:
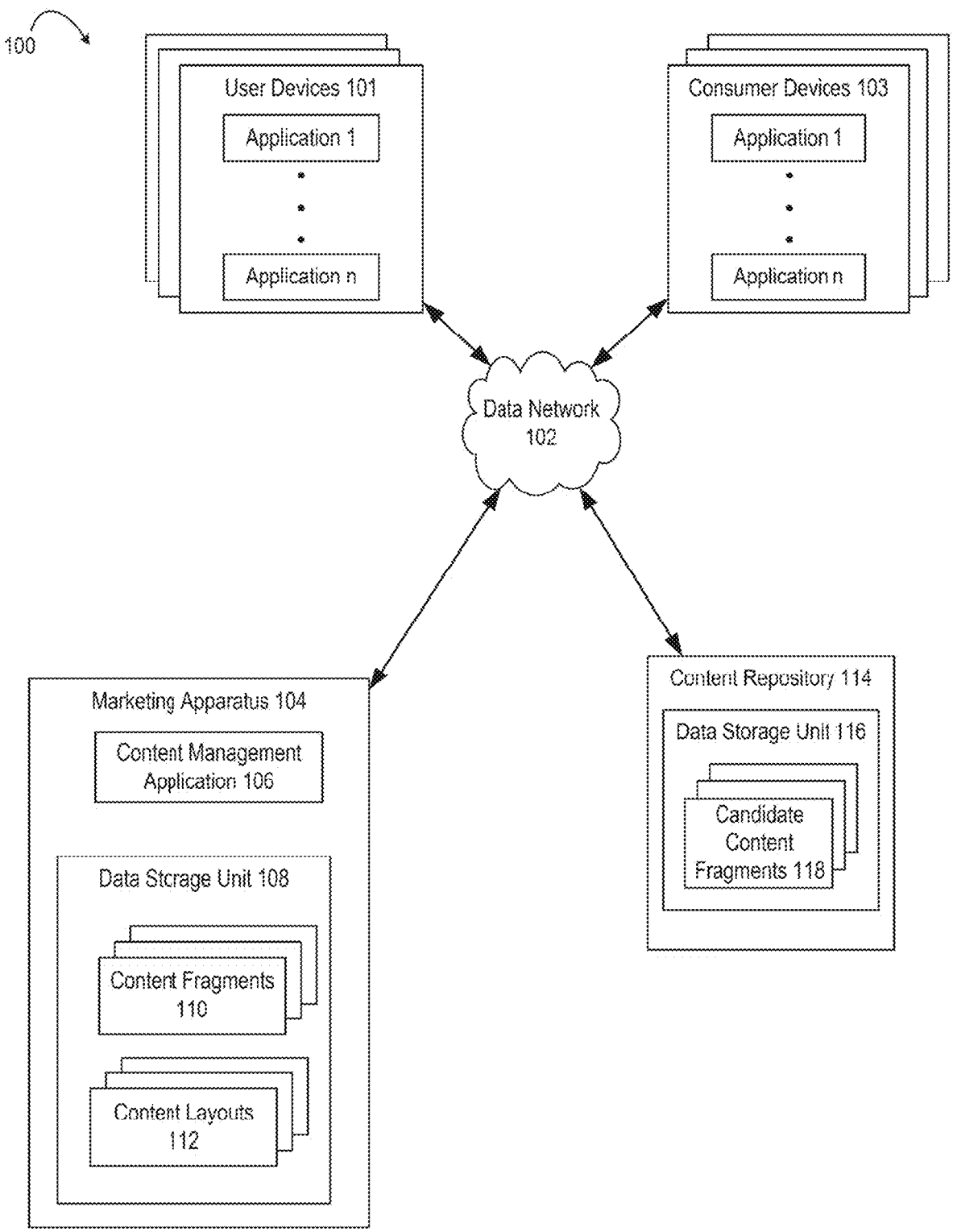
FIG. 1 depicts an example of a network environment for bundling or arranging online content fragments for presentation based on content-specific metrics and inter-content constraints, according to certain embodiments of the present disclosure.

Certain embodiments involve bundling and arranging (e.g., obtaining, preparing, and grouping) online content fragments for presentation based on content-specific metrics and inter-content constraints. For example, a content management application, which is executed by one or more processing devices, accesses data that includes candidate content fragments, a content-specific metric, and an inter-content constraint. The content management application computes minimum and maximum contribution values for the candidate content fragments. The content management application selects, based on the computed minimum and maximum contribution values, a subset of the candidate content fragments. The content management application applies, subject to the inter-content constraint, a bundle-selection function to the selected candidate content fragments and thereby identifies a bundle of online content fragments. The content management application outputs the identified bundle of online content fragments for presentation via an online service.

These illustrative embodiments are mentioned not to limit or define the disclosure, but to provide examples to aid understanding thereof. Additional embodiments are discussed in the Detailed Description, and further description is provided there.

DETAILED DESCRIPTION

The present disclosure includes embodiments for performing one or more of bundling and arranging online content fragments for presentation based on content-specific metrics and inter-content constraints. Online content fragments can be a combination of text, image, video, or any other content along with a layout of these content fragments. Bundling online content fragments involves selecting a set of online content fragments that are likely to obtain a desired value for one or more content-specific metrics (e.g., amount of time a user device accesses an online service, desirable interactions with the online service by the user device, etc.). Arranging online content fragments involves distributing the online content fragments in a layout (e.g., a grid layout) for presentation via an online service, where the distribution satisfies one or more inter-content constraints (e.g., desired similarity of certain items, desired dissimilarity of certain items, etc.).

In some embodiments, a content management application automatically creates "bundles" of online content fragments based on one or more content-specific metrics or combinations of content-specific metrics (e.g., time spent, ad revenue, etc.). The content management application scores, ranks, or otherwise evaluates the online content fragment bundles based on the content-specific metrics. In some embodiments, the content management application also accounts for inter-content constraints (e.g. content diversity, content coherence, etc.) that need to be satisfied or optimized in the resulting bundles of content fragments. For example, the content management application receives inputs including a set of online content fragments and one or more content-specific metrics to be optimized. Given these inputs, the content management application automatically selects the bundle of content that optimizes the content-specific metrics and ensures that the inter-content constraints are optimized. The content management application also assigns a score (e.g., profit or other value) to the selected content based on the combination of the performance content-specific metrics and inter-content constraints.

Any suitable content management application may use the bundling embodiments described herein. In one example, content management applications such as Adobe® Experience Manager use content fragments to facilitate the creation of experience components that can be reused across several pages, channels, and other online media portals. The online content fragments can be centrally designed and used across several pages, screens, and other content delivery portals or devices in the appropriate rendition based on their design. In some embodiments, the content management application individually tracks different content fragments and collates their performance statistics. Such a framework can facilitate automatic, goal-based experience selection that accounts for multiple content-specific metrics and the content interactions.

Some embodiments for bundling of content fragments subject to inter-content constraints are used to augment rankings that would otherwise be performed purely based on content-specific metrics. For example, the content management application optimizes the content bundle based on a combination of content metrics and the targeted content-specific metrics. To apply the inter-content constraints, the content management application accounts for the objectives such as, for example, whether the combination of the online content items is cohesive or diverse. Certain embodiments represent dissimilarity between the online content items to ensure a cohesive or a diverse combination is selected by the algorithm.

In additional or alternative embodiments, the content management application automatically arranges a set of online content fragments (e.g., a bundle selected using the embodiments above) based on one or more content-specific metrics (e.g., profit, ad revenue, etc.) and inter-content constraints. For example, the content management application accounts for different variants of online content fragments (e.g., different sizes of the same fragment) to choose an appropriate variant based on the content-specific metrics. The content management application distributes the online content fragments in a two-dimensional ("2D") grid or other suitable layout based on the properties and size constraints of the selected fragments and the layout. In doing so, the content management application accounts for the inter-content affinities or other inter-content constraints to account for any content conflicts in the distribution (e.g., insufficient similarity or insufficient diversity among the fragments).

In some embodiments, the content management application automatically distributes the online content fragments into a grid layout by accounting for the profits that the online content fragments yield for specific content-specific metrics.

The content management application implicitly accounts for content-specific affinities and constraints. Some embodiments of the content management application have sufficient flexibility to allow parts of the experience to be fixed by the author and operate on the other pieces by accounting for these preferences as additional constraints.

Example of an Operating Environment for Bundling or Arranging Online Content Fragments for Presentation Based on Content-Specific Metrics and Inter-Content Constraints.

Referring now to the drawings, FIG. 1 depicts an example of an operating environment 100 for bundling or arranging online content fragments for presentation based on content-specific metrics and inter-content constraints, according to certain embodiments of the present disclosure. In the example depicted in FIG. 1, various user devices 101 access a marketing apparatus 104 via a data network 102. In some embodiments, various consumer devices 103 access the marketing apparatus 104 or other system to which online content is provided by the user device 101. The marketing apparatus 104 executes one or more content management applications 106 (or other suitable program code) for performing one or more functions used in bundling or arranging online content fragments for presentation.

Some embodiments of the operating environment 100 include user devices 101 and consumer devices 103. Examples of these devices include, but are not limited to, a personal computer, a tablet computer, a desktop computer, a processing unit, any combination of these devices, or any other suitable device having one or more processors. Each of the user devices 101 and consumer devices 103 is communicatively coupled to the marketing apparatus 104 via the data network 102. A user of the user device 101 uses various products, applications, or services supported by the marketing apparatus 104 via one or more data networks 102. A user of the consumer device 103 accesses and interacts, via one or more data networks 102, with various online content generated by one or more user devices with the products, applications, or services supported by the marketing apparatus 104. Examples of the data network 102 include, but are not limited to, internet, local area network ("LAN"), wireless area network, wired area network, wide area network, and the like.

The marketing apparatus 104 hosts one or more application programs to facilitate the creation of digital experiences for consumers or other end users. The marketing apparatus 104 provides the applications (e.g., the content management application 106) as a software as a service ("SaaS"), or as a standalone application that can be installed on a computing device (e.g., a device used by a marketer), or as a combination of both. The marketing apparatus 104 hosts one or more application programs to facilitate the creation of digital experiences for consumers or other end users. The marketing apparatus 104 provides the applications (e.g., the content management application 106) as a software as a service ("SaaS"), or as a standalone application that can be installed on a computing device (e.g., a device used by a marketer), or as a combination of both. The marketing apparatus 104 can be implemented using one or more servers, one or more platforms with corresponding application programming interfaces, cloud infrastructure, and the like. In addition, each engine can also be implemented using one or more servers, one or more platforms with corresponding application programming interfaces, cloud infrastructure, and the like.

The marketing apparatus 104 includes a data storage unit 108. The data storage unit 108 can be implemented as one or more databases or one or more data servers. The data storage unit 108 includes one or more sets of content fragments 110 and one or more content layouts 112 used by the content management application 106, as described in further detail herein.

In some embodiments, the marketing apparatus 104 communicates with one or more content repositories 114 via one or more data networks 102. A content repository 114 includes one or more data storages units 116, on which candidate content fragments 118 are stored. The marketing apparatus 104 retrieves or otherwise obtains copies of the candidate content fragments 118 and stores these copies in the data storage unit 108 as the sets of content fragments 110.

Bundling online content fragments for presentation based on content-specific metrics and inter-content constraints.

In some embodiments, the content management application 106 accesses a set of online content fragments and bundles a certain subset of the online content fragments for presentation via an online service. The bundling is performed based on one or more content-specific metrics and inter-content constraints.

Figure 2:
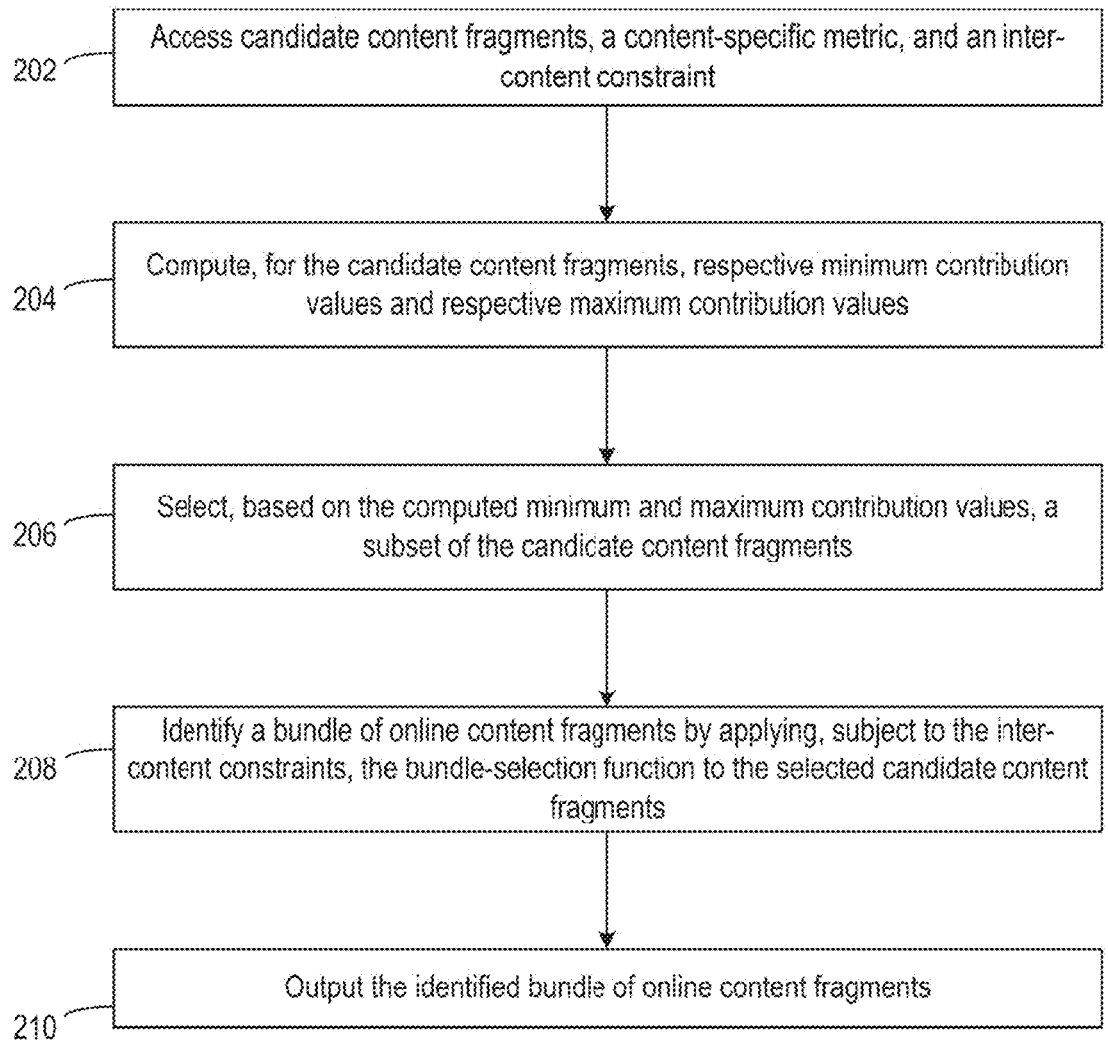
FIG. 2 depicts an example of a process that bundles online content fragments for presentation based on content-specific metrics and inter-content constraints, according to certain embodiments of the present disclosure.

For instance, FIG. 2 depicts an example of a process 200, which may be performed by the marketing apparatus 104 or another suitable computing system, that bundles online content fragments for presentation based on content-specific metrics and inter-content constraints, according to certain embodiments. One or more processing devices implement operations depicted in FIG. 2 by executing suitable program code (e.g., the content management application 106). For illustrative purposes, the process 200 is described with reference to certain examples described herein. Other implementations, however, are possible.

At block 202, the process 200 involves accessing candidate content fragments, one or more content-specific metrics, and one or more inter-content constraints. In some embodiments, the inputs received at block 202 also include a bundle size. One or more processing devices execute suitable program code (e.g., one or more modules of the content management application 106) to implement block 202. Executing the content management application 106 causes the processing device to access the candidate content fragments 118, content-specific metrics, and inter-content constraints from a non-transitory computer-readable medium. In various embodiments, this is a non-transitory computer-readable medium on which the content management application 106 is stored, a different non-transitory computer-readable medium available on the marketing apparatus 104 (e.g., a data storage unit 108), or a non-transitory computer-readable medium available on a content repository 114 that is remote from the marketing apparatus 104 (e.g., a data storage unit 116). In some embodiments, accessing the candidate content fragments 118, content-specific metrics, and inter-content constraints involves communicating, via a data bus, suitable signals between a local non-transitory computer-readable medium and the processing device. In additional or alternative embodiments, accessing the candidate content fragments 118, content-specific metrics, and inter-content constraints involves communicating, via a data network, suitable signals between a computing system that includes the non-transitory computer-readable medium and a computing system that includes the processing device.

In some embodiments the accessed data at block 202 includes a list of online content fragments along with their performance statistics. The accessed data also includes one or more target metrics for optimization. The accessed data also includes inter-content constraints with which a generated bundle of online content fragments must comply. An example of an environment in which the content management application 106 may be implemented is an ecommerce environment, in which an online service exposes various online content (e.g., content representing products and services) to user devices, which may be used to purchase sets of products or services via a data network. In this example, the profitability of one product or service may depend on the other products or services in the set of items. Thus, user interactions with corresponding online content may depend, at least in part, on inter-content relationships and constraints.

The online content fragments can be obtained through any suitable process. In some embodiments, the content management application 106 receives input, via a graphical interface and from one or more user devices 101, that identifies a location of the online content fragments. In additional or alternative embodiments, the content management application 106 receives one or more online content fragments via a graphical interface and from one or more user devices 101.

The content-specific metrics can also be obtained through any suitable process. In some embodiments, the content management application 106 receives input, via a graphical interface and from one or more user devices 101, that identifies a location of the content-specific metrics, provides the content-specific metrics, or both. In additional or alternative embodiments, the content management application 106 includes or communications with another application or module that computes the content-specific metrics. For example, one or more suitable analytics applications may compute content-specific metrics for online content that is attributable to various content fragments.

The inter-content constraints can also be obtained through any suitable process. In some embodiments, the content management application 106 receives input, via a graphical interface and from one or more user devices 101, that identifies the inter-content constraints. In additional or alternative embodiments, the content management application 106 receives input, via a graphical interface and from one or more user devices 101, that defines or otherwise provides one or more rules for computing content-specific constraints. For instance, the content management application 106 or another suitable application can compute affinities based on, for example, cosine distances between representations of various content fragments (e.g., vectors representing various content fragments). Additionally or alternatively, other distance measurements or comparisons between vector representations of content fragments (e.g., Euclidean distances) may be used as values for inter-content constraints (e.g., measurements of similarity or dissimilarity as represented by proximity or distance in a vector space). Two content fragments may be considered sufficiently similar (i.e., have a threshold amount of similarity) if their vector representations have cosine distance or other vector-based quantity within a certain threshold. Conversely, content fragments may be considered sufficiently diverse (i.e., have a threshold amount of diversity) if their vector representations have cosine distance or other vector-based quantity that exceeds a certain threshold. In some embodiments, the content management application 106 obtains one or more inter-content constraints by capturing the performance of certain content fragments that are presented in the same online experience. For instance, the content management application 106 may communicate with an analytics engine executed by the marketing apparatus 104 that monitors interactions with online experiences by consumer devices 103. The analytics engine generates, derives, or otherwise obtains performance data for a given online experience (e.g., a web page or set of web pages provided to one or more consumer devices 103). The performance data indicates the extent to which desirable interactions occurred in the online experience (e.g., clicks, online purchases, conversions, etc.). The content management application 106 obtains this performance data from the analytics engine, and determines that certain experiences involving combinations of content fragments resulted in certain performance metrics. The content management application 106 computes or otherwise determines inter-content affinities based on these performance metrics being associated with combinations of content fragments.

The content-specific metrics of the online content fragments may depend on which online content fragments are selected for presentation together in a bundle. A bundle-selection problem can be modeled, by the content management application 106 110, as a quadratic 0-1 integer program. An example of a function implementing this program is:

$$\max_{x \in (0,1)^n, |x|=k} r^T x + \lambda x^T Q x.$$

In this function, the vector r represents a reward associated with each individual online content fragment. The matrix Q represents an additional reward or penalty that is incurred if two fragments are selected for presentation together in a bundle. An integer program ensures that x takes a value of 0 or 1, where a value of 1 indicates the selection of the corresponding online content fragment. The optimization problem is used by the content management application 106 for selecting a set of online content fragments with certain content-specific metrics (indicated by the vector r) and for determining that the bundle of online content fragments is suitable for presentation together (indicated by the second term $x^T Q x$). The term $\lambda$ is positive if Q represents a reward and is negative if Q represents a penalty. If $\lambda$ is 0, the optimization problem is used to select the online content fragments with the top content-specific metrics.

In some embodiments, the content management application 106 computes r vectors from the accessed content-specific metrics. The content management application 106 computes Q matrices from the inter-content constraints.

The formulation used above can be shown to be a special case of the quadratic knapsack problem. Examples of a quadratic knapsack problem are described in Zhu et al., "Bundle Recommendation in Ecommerce," Proc. 37th Int. ACM SIGIR Conf. Res. Dev. Inf. Retr, 2014, pages 657-66, which is incorporated by reference herein. A generalized quadratic knapsack problem is given by:

$$\max\{\Sigma_{i \in N} \Sigma_{j \in N} P_{ij} x_i x_j\}.$$

subject to $$\Sigma_{j \in N} w_j x_j \leq c, x_i \in \{0,1\}, j \in N$$

In these formulas, the term $P_{ij}$ represents the effects of the reward vector r. The term $P_{ij}+P_{ji}$ represents the effects of values from the matrix Q. The bundle recommendation problem has an additional constraint requiring that a maximum of k items is selected, i.e., $|x|=k$. This constraint, as applied by the content management application 106 in certain embodiments, makes the bundle recommendation problem a special case of the quadratic knapsack problem.

For large values of N, maximizing this objective function over the space of all feasible solutions not feasible, since the computation problem is NP-hard. To account for this computing difficulty, the content management application 106 reduces the size of the search space (i.e., the set of candidate content fragments) by calculating the maximum and the minimum contribution of each online content fragment to a suitable objective function.

For instance, at block 204, the process 200 involves computing, for the candidate content fragments, respective minimum contribution values and respective maximum contribution values. One or more processing devices execute suitable program code (e.g., one or more modules of the content management application 106) to implement block 204. Executing the content management application 106 causes the processing device to compute the contribution values. In some embodiments, the content management application 106 computes the minimum contribution of a candidate content fragment i using the following function:

$$P^i_{min} = r_i + \lambda \min_{|S'|=k-1, S' \subseteq \{1,\ldots,i-1,i+1,\ldots,n\}} \sum_{j \in S'} Q_{i,j}.$$

The content management application 106 computes the maximum contribution of a candidate content fragment i using the following function:

$$P^i_{max} = r_i + \lambda \min_{|S'|=k-1, S' \subseteq \{1,\ldots,i-1,i+1,\ldots,n\}} \sum_{j \in S'} Q_{i,j}.$$

In this manner, the content management application 106 computes maximum possible contributions and minimum possible contributions for respective fragments in a set of candidate content fragments 118.

At block 206, the process 200 involves selecting, based on the computed minimum and maximum contribution values, a subset of the candidate content fragments. One or more processing devices execute suitable program code (e.g., one or more modules of the content management application 106) to implement block 206. In some embodiments, this selection operation facilitates the application of a bundle-selection function. For instance, executing the content management application 106 causes the processing device to eliminate a fragment i under consideration if one or more fragments k have a $P_{min}$ greater than the $P_{max}$ of the fragment i (e.g., $P_{min}^k > P_{max}^i$). This eliminates candidate content fragments whose maximum possible contribution is low (e.g., that would result in one or more sub-optimal content metrics for a selected set containing such a fragment).

In some embodiments, the content management application 106 eliminates a fragment by accessing and modifying an "ignoreFragment" list that is stored in a non-transitory computer-readable medium. If the content management application 106 determines that $P_{min}^k > P_{max}^i$ for a given content fragment i, the content management application 106 modifies the "ignoreFragment" list in the non-transitory computer-readable medium by adding a fragment identifier for the fragment i to the list.

At block 208, the process 200 involves identifying a bundle of online content fragments by applying, subject to the inter-content constraint, a bundle-selection function to the selected candidate content fragments. One or more processing devices execute suitable program code (e.g., one or more modules of the content management application 106) to implement block 208. Executing the content management application 106 causes the processing device to apply the bundle-section function using the inter-content constraints accessed at block 202 and the set of identified candidate fragments from block 206.

In one example, the content management application 106 accesses an "ignoreFragment" list and selects content fragments whose identifiers are not on the list. The content management application 106 solves a quadratic knapsack problem (or otherwise applies a suitable bundling function) to the selected content fragments using a branch-and-bound optimization framework. The branch-and-bound optimization framework, as executed by the content management application 106, decomposes the original knapsack problem into sub-problems and repeats this process until the content management application 106 can eliminate a subset of these. The sub-problems that can be proved to not yield the optimal solution are eliminated. The overall algorithm is a tree traversal, where sub optimal branches are removed and an exhaustive search over the remaining branches yields the desired solution.

At block 210, the process 200 involves outputting the identified bundle of online content fragments. One or more processing devices execute suitable program code (e.g., one or more modules of the content management application 106) to implement block 210. Executing the content management application 106 causes the processing device to store identification data identifying the bundle of online content fragments in a suitable non-transitory computer-readable medium. In some embodiments, the content management application 106 transmits the identification data to one or more user devices 101. In additional or alternative embodiments, the content management application 106 transmits the identified bundle of online content fragments. In these embodiments, the content management application 106 transmits the relevant data by configuring one or more network interface devices to transmit the data to a client device (e.g., a user device 101) via a data network 102.

The following example illustrates certain aspects of the bundling embodiments described herein. In this example, the content management application 106 accesses a set of three online content fragments XF (i.e., XF=1, 2, or 3) and is configured with a requirement to choose a bundle of size two content fragments from the set of three content fragments. The reward associated with these online content fragments is given by the vector $$r = \begin{bmatrix} 3 \\ 4 \\ 5 \end{bmatrix}.$$

In the absence of an inter-content constraint, the bundle may be selected purely by maximizing the rewards using this reward vector. An example of the resulting bundle combination is provided in Table 1.

TABLE 1

| Bundle | Reward |
|--------|--------|
| 1, 2   | 7      |
| 1, 3   | 8      |
| 1, 4   | 9      |

Therefore, the second and third online content fragments should form the optimal bundle.

But in cases involving inter-content constraints, the content management application 106 bundles content fragments using data describing an affinity (or other inter-content constraint) that exists between various content fragments. An affinity indicates, for example, that certain content fragments are more or less likely to elicit interaction from one or more consumer devices 103 if the content fragments are presented together in a web page or other online experience. (For example, content depicting health food and a content depicting chocolate may not elicit interaction from a desired set of consumers.) A Q matrix represents affinities between content fragments. Continuing with the example above, which involves online content fragments with rewards $$r = \begin{bmatrix} 3 \\ 4 \\ 5 \end{bmatrix},$$

an example of a Q matrix representing inter-fragment affinity is:

$$\begin{bmatrix} 0 & 10 & 10 \\ 10 & 0 & -2 \\ 10 & -2 & 0 \end{bmatrix}.$$

In this example, the values in this Q matrix show that selecting both XF=2 and XF=3 results in a negative affinity value. This negative affinity value indicates that presenting these two content fragments together is less likely to successfully elicit desirable interactions with the content fragments by one or more consumer devices 103. But selecting both XF=1 and XF=2 or selecting both XF=1 and XF=3 boosts the overall reward, thereby indicating that these bundles of content fragments are more likely to successfully elicit desirable interactions by one or more consumer devices 103.

Table 2 includes rewards for different bundles in this example.

TABLE 2

| Bundle | Reward |
| --- | --- |
| 1, 2 | 7 + 10 = 17 |
| 1, 3 | 8 + 10 = 18 |
| 1, 4 | 9 − 2 = 7 |

Thus, in this example, the bundle of XF=1 and XF=3 include fragments that have desirable content-specific metrics and that also have higher affinity (i.e., satisfy affinity-based inter-content constraints).

Experimentation Examples for Bundling Online Content Fragments for Presentation Based on Content-Specific Metrics and Inter-Content Constraints.

In experiments involving certain embodiments described herein, a dataset of food-based content fragments was used for a content provider of different food products and services. The experiment involved 5000 content fragments of different types (e.g., articles, videos, profiles, etc.). In the experiment's dataset, each content fragment had a title and a short description that determined the content affinities for defining the conflicts graph. Content-specific metrics (e.g., ad revenue) were attributed to the set XF of content fragment by sampling from a Poisson distribution. In this experiment, a set of the top 30 content fragments that matched the query "cake" were used to create a bundle of five content fragments.

In this experiment, the reward r was the ad revenue attributed to a particular set XF of different content fragments, where ad revenue data was collected by sampling from a Poisson distribution. The inter-content constraint Q was the inter-content similarity, as measured by a cosine distance between vector representations of different content fragments. For a positive λ, these parameters result in bundle that maximizes the total ad revenue in the selected bundle (i.e., the content-specific metric) and that selected a cohesive set of content (i.e., that satisfied the inter-content constraint).

Figure 3:
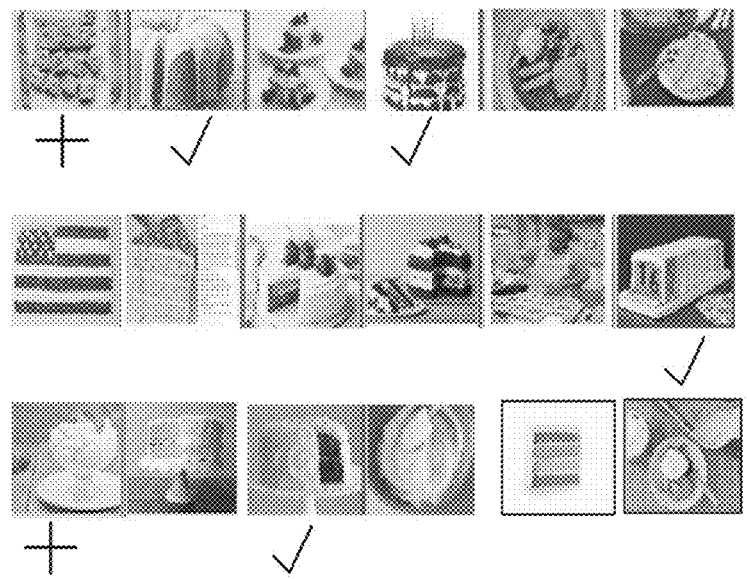
FIG. 3 depicts an example of a bundle of online content fragments selected based on their semantic similarity using the process of FIG. 2, according to certain embodiments of the present disclosure.

FIG. 3 depicts a set of bundling results 300 from this experiment. As depicted in FIG. 3, the images with check marks underneath them are the content fragments selected in the bundle. The images with plus signs under them are the content fragments that were highly ranked (e.g., in the top five) using content-specific metrics alone (i.e., ad revenue), but were not selected due to non-compliance with the inter-content constraints in Q.

In the selected bundle, the content fragments are related to baking and cakes. The content fragments titled "This Tie-Dyed Cake" and "Orange Poppy Bundt Cake Bake-Ahead Batches" have the largest values for content-specific metrics, and are therefore selected because of their associated high profit. But the chef profile "Foodie Call with Justin Warner: Black-Garlic Mayo" was not get selected because it lacked similarity to the other selected fragments that are related to cakes. Another content fragment that would have been featured in a bundle based on content-specific metrics alone is the fragment titled "Chefs picks: Easter desserts." This fragment is less semantically similar to the other selected fragments in the bundle because the fragment depicts desserts in general rather than a cake specifically. Hence, in spite of having a higher value for a content-specific metric than the first selected content fragment, the "Chefs picks: Easter desserts" fragment was not selected by a content management application. Thus with Q indicating the similarity between fragments, the content management application selected a cohesive bundle of content fragments.

Figure 4:
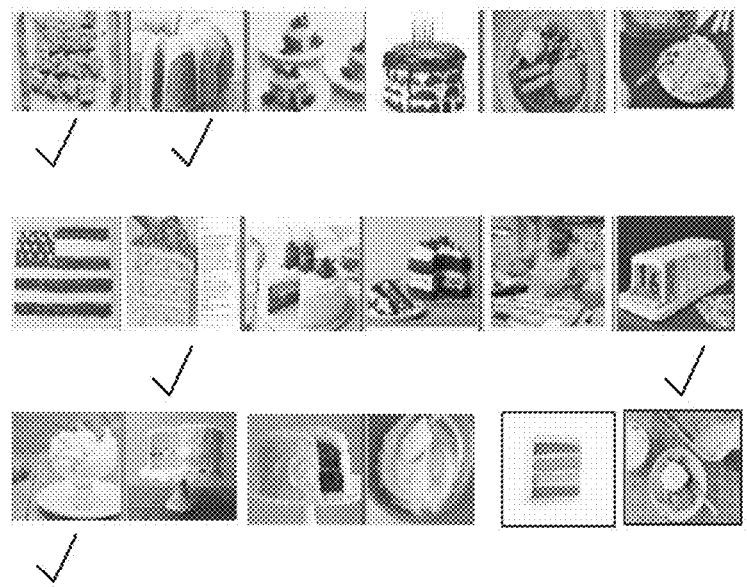
FIG. 4 depicts an example of a bundle of online content fragments selected based on their semantic diversity using the process of FIG. 2, according to certain embodiments of the present disclosure.

In another aspect of the experiment, the inter-content constraint Q was inverted to indicate dissimilarity among the fragments (e.g., 1−cos ( )). The corresponding results 400 are shown in FIG. 4. The images of desserts that were excluded (but highly ranked) in the example of FIG. 3 are selected in the example of FIG. 4 because these images increase the semantic diversity of the resulting bundle.

Arranging Online Content Fragments for Presentation Based on Content-Specific Metrics and Inter-Content Constraints.

In embodiments for arranging online content fragments, the content management application 106 distributes a set of online content fragments into a grid layout, while optimizing for one or more content-specific metrics. For example, XF denotes a set of available online content fragments. Each online content fragment in XF can be represented by a tuple (h,w,p), where h is the height of a particular fragment variant and w is width of the particular fragment variant. In some embodiments, p is the profit value of the content-specific metrics associated with particular fragment variant. In additional or alternative embodiments, p is a profit value obtained from a bundling process (e.g., the process 200 described above), where the profile value is the value contributed by a fragment to a selected bundle. The content management application 106 can distribute elements from XF inside a grid G=(H,W), where H and W are respectively the height and width of the grid, in a manner that maximizes the cumulative profit or other content-specific metric of the selected online content fragments and that accounts for inter-content conflicts or constraints.

In addition to maximizing the overall addition of the content-specific metrics value, the content management application 106 determines the optimal size of an online content fragment in the final distribution (by selecting its appropriate variant) and accounts for any inter-content affinity preferences while deciding the distribution. The content management application 106 allows each online content fragment $XF_1$ to have multiple possible manifestations or versions. Two versions may differ in the layout within the online content fragment, the dimensions of the online content fragment, or the associated content-specific metrics. XF~ denotes this extended set of online content fragments, containing multiple versions of the same online content fragment.

The content management application 106 distributes a subset of elements from XF~ inside the grid G in a manner that optimizes the cumulative profit (or other content-specific metrics), subject to a constraint on selecting a maximum of one version per online content fragment and the inter-content affinities. The first constraint reduces repetition of content on the rendered grid layout. The second constraint enables a cohesive experience rendering as dictated by the defined conflicts.

Figure 5:
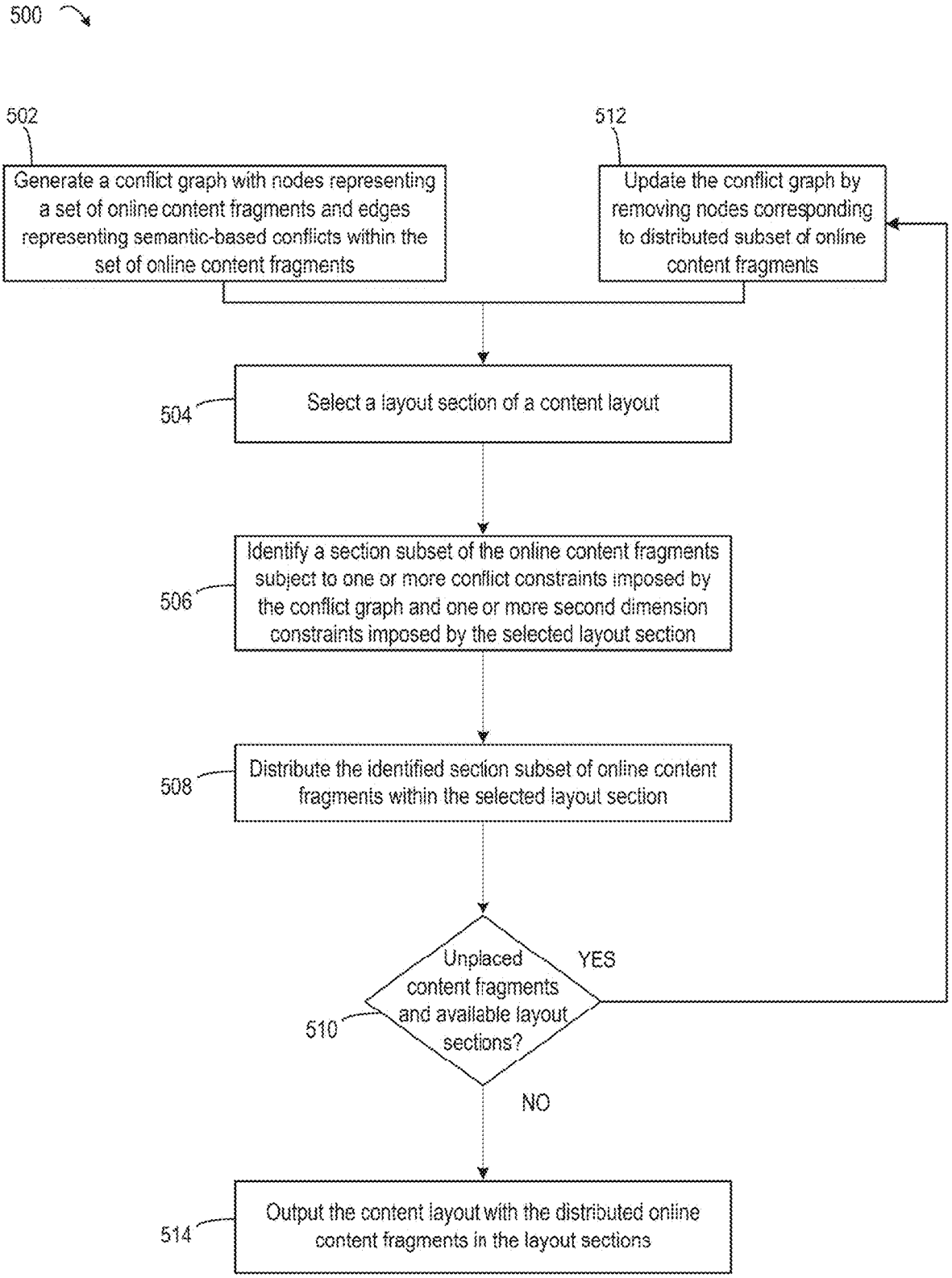
FIG. 5 depicts an example of a process that arranges online content fragments for presentation based on content-specific metrics and inter-content constraints, according to certain embodiments of the present disclosure.

FIG. 5 depicts an example of a process 500, which may be performed by the marketing apparatus 104 or another suitable computing system, that arranges online content fragments for presentation based on content-specific metrics and inter-content constraints, according to certain embodiments. One or more processing devices implement arrangement operations depicted in FIG. 5 by executing suitable program code (e.g., the content management application 106). For illustrative purposes, the process 500 is described with reference to certain examples described herein. Other implementations, however, are possible.

At block 502, the process 500 involves generating a conflict graph with nodes representing a set of online content fragments and edges representing semantic-based conflicts within the set of online content fragments. One or more processing devices execute suitable program code (e.g., one or more modules of the content management application 106) to implement block 502. The conflict graph uses "conflicts" between content fragments to indicate one or more inter-content constraints for which the content management application 106 must account in the distribution of content fragments within a grid or other content layout 112.

Executing the content management application 106 at block 502 causes the processing device to access a set of online content fragments 110 from a non-transitory computer-readable medium. In various embodiments, the accessed non-transitory computer-readable medium is a non-transitory computer-readable medium on which the content management application 106 is stored, a different non-transitory computer-readable medium available on the marketing apparatus 104 (e.g., a data storage unit 108), or a non-transitory computer-readable medium available on a content repository 114 that is remote from the marketing apparatus 104 (e.g., a data storage unit 116). In some embodiments, accessing the online content fragments 110, content-specific metrics, and inter-content constraints involves communicating, via a data bus, suitable signals between a local non-transitory computer-readable medium and the processing device. In additional or alternative embodiments, accessing the online content fragments 110, content-specific metrics, and inter-content constraints involves communicating, via a data network, suitable signals between a computing system that includes the non-transitory computer-readable medium and a computing system that includes the processing device.

The set of online content fragments used at block 502 may be obtained in any suitable manner. In some embodiments, block 502 is performed on a bundle of online content fragments outputted at block 210 of the process 200. But other implementations are possible.

In some embodiments, executing the content management application 106 at block 502 causes the processing device to construct a conflict graph Gr. The conflict graph Gr represents inter-fragment conflicts and affinities. The content management application 106 represents each fragment in a set XF~ of online content fragments by a node in the conflict graph Gr. An edge between two nodes represents an inter-fragment conflict. A weight applied to the edge represents a degree of conflict.

In some embodiments, if the similar content is to be grouped together, the content management application 106 can create an edge between node $n_i$ and $n_j$ with the following weight:

$$\frac{1}{sim(XF_i, XF_j)}$$

This ensures that more similar content have lesser conflicts within themselves, as opposed to diverse content. In additional or alternative embodiments, creating an edge with weight $sim(XF_i, XF_j)$ causes diverse content to be grouped together. In additional or alternative embodiments, other affinities based on content-specific metrics can be derived based on pre-specified rules (e.g., common impressions between $XF_i$ and $XF_j$ that can be used as a conflict). In additional or alternative embodiments, to account for multiple variants of the same online content fragment, the content management application 106 can introduce an edge with weight of 1 between nodes $n_i$ and $n_j$ if these nodes are versions of the same parent online content fragment. An edge in the graph with a weight of 1 represents an absolute conflict. This ensures that two elements connected by an absolute conflict cannot both be selected simultaneously for distribution into the grid.

At block 504, the process 500 involves selecting a layout section of a content layout, such as a section of a grid layout. One or more processing devices execute suitable program code (e.g., one or more modules of the content management application 106) to implement block 504. Executing the content management application 106 causes the processing device to select, for a particular iteration in the process 500, a section of a content layout 112 (e.g., a grid layout) for which an optimal distribution of online content fragments is to be determined.

In the process 500, the content management application 106 selects a given section at block 504 and determines, in other operations an optimal distribution that maximizes the cumulative content-specific metric value, and proceeds to select the next section. The content-specific metric yield of the section $S_i$ is greater than section $S_j$ if $S_i$ was selected before In some embodiments, the higher or the topmost area in the grid is more prominent and is be distributed with higher-value content as compared to the lower parts of the grid. In this case, the content management application 106 starts with the region with the highest eminence.

The content management application 106 selects a rectangular section $S=(h_{max}, W)$, such that the top edge of section S coincides with the top edge of the available grid size. The height $h_{max}$ is the maximum of the heights of the online content fragments in the conflict graph. The width W is the width of the grid. In some embodiments, the width of the section is kept to the width of grid. In some embodiments, the content management application 106 divides the area into different chunks of varying width for further optimization. The flexibility in the size of the rectangular area of the current iteration allows for fixing certain fragments in pre-specified locations to enable a semi-automated distribution.

At block 506, the process 500 involves identifying a section subset of the online content fragments subject to one or more conflict constraints imposed by the conflict graph and one or more second dimension constraints imposed by the selected layout section. One or more processing devices execute suitable program code (e.g., one or more modules of the content management application 106) to select the section subset (i.e., the subset of the online content fragments to be included in the layout section).

For example, executing the content management application 106 causes the processing device to identify, derive, or otherwise obtain a graph $Gr'=(V,E)$ from the conflict graph Gr. The graph Gr' corresponds to content fragments with conflicts above a certain threshold. For each node in Gr, the content management application 106 creates a corresponding node in Gr'. For each edge in Gr with a weight greater than a threshold σ, the content management application 106 creates a similar edge in Gr'. For instance, the content management application 106 accesses one or more values of the threshold σ from a suitable non-transitory computer-readable medium. The content management application 106 compares a given weight in the graph Gr to the accessed threshold σ. If the content management application 106 determines that a given weight exceeds the threshold σ, the content management application 106 updates the graph Gr' in the non-transitory computer-readable medium to include the same or similar weight. The content management application 106 repeats this process for some or all nodes in the graph Gr.

In some embodiments, the threshold σ is determined empirically so as to ensure a conflict between content fragments with a sufficiently high value for an inter-content constraint (e.g., sufficiently high similarity or diversity). The threshold σ is determined empirically so as to ensure that a sufficient number of mutually non-conflicted content fragments are available to distribute over a selected layout section. In some embodiments, the content management application 106 accesses one or more different threshold values σ at different iterations of the process 500.

The problem of distributing the online content fragments into the grid can be modeled as a 2D knapsack problem with conflicts. The resulting optimization problem is given by the following equation:

$$\max \Sigma_{i=1}^n p_i x_i,$$

such that $$\Sigma_{i=1}^n c_i x_i < C,$$

$$x_i + x_j \leq 1 \forall (i,j) \in E, \text{ and}$$

$$x_j \in \{0,1\} j=1 \ldots n$$

In this formula, $c_i = h_i * w_i$, $C = h_{max} * W$ indicates the cost of the online content fragment and the grid section, respectively. The second constraint ensures that two adjacent nodes in Gr' (corresponding to online content fragments with conflict) cannot belong to the selected subset. Let $XF_{selected}$ represent this subset of selected online content fragments. The set of elements selected through the above knapsack problem is the optimal selection of rectangles that can be packed into a grid of size $S=(h_{max},W)$ while optimizing for one or more content-specific metrics.

At block 508, the process 500 involves distributing the section subset of online content fragments within the selected layout section. One or more processing devices execute suitable program code (e.g., one or more modules of the content management application 106) to implement block 508.

For example, executing the content management application 106 causes the processing device to select a set of rectangles $R=\{(h,w)\}$ and grid $G=(H,W)$ that satisfies the Steinberg inequality. The Steinberg inequality is described in Steinberg, A. "A Strip-Packing Algorithm with Absolute Performance Bound," SIAM Journal on Computing 26.2 (1997), pages 401-409.

The Steinberg inequality is provided by the following formula:

$$h_L < H, w_L < W, 2*S_L <= H*W - (2*h_L - H)_+ (2*w_L - W)_+,$$
where $$h_L = \max h_i, \; w_L = \max w_i, \; S_L = \sum h_i w_i, \; x_+ = \frac{(x+|x|)}{2}.$$

For this set of rectangles, the content management application 106 can arrange $XF(i=1, \ldots n)$ in page $P=(H,W)$. Application of the Steinberg inequality theorem yields that the input rectangles with a total area at most HW/2 can be placed in $G=(H,W)$, if the width (or height) of any XF is at most H/2. The Steinberg inequality is used by the content management application 106 to distribute content fragments into an input grid having a grid of size (2×H, W). In some embodiments, the constraints of the 2D knapsack problem with conflicts ensure that the Steinberg inequality is satisfied. The content management application 106 uses the Steinberg's Algorithm to distribute the online content fragments in $XF_{selected}$ into $S\sim=(2\times h_{max}, W)$.

Using the Steinberg inequality can result in a unoccupied gaps (e.g., white spaces) in the selected layout section. In some embodiments, the content management application 106 pushes the online content fragments upwards and from right to left to remove the whitespaces and arrange online content fragments as tightly as possible (e.g., by minimizing gaps between different online content fragments).

At block 510, the process 500 involves determining whether additional unplaced content fragments exist and available layout sections exist. One or more processing devices execute suitable program code (e.g., one or more modules of the content management application 106) to implement block 510. Executing the content management application 106 causes the processing device to access the set of content fragments XF~ and the layout under consideration. The content management application 106 determines if the set of content fragments XF~ includes content fragments to be placed in the layout. The content management application 106 also determines if the layout includes one or more sections to which content fragments from the set XF~ have not been assigned by the process 500.

If additional unplaced content fragments exist and layout sections are available, the process involves updating the conflict graph by removing nodes corresponding to the distributed subset of online content fragments, as depicted at block 512, and iterating blocks 704, 706, 708, and 710. One or more processing devices execute suitable program code (e.g., one or more modules of the content management application 106) to implement block 512. In some embodiments, executing the content management application 106 causes the processing device to update the conflict graph Gr to reflect the selection and distribution of online content fragments by the process 500. The content management application 106 removes nodes in G corresponding to online content fragments in a set of selected fragments (i.e., the set $XF_{selected}$). The content management application 106 also removes variants of the selected online content fragments to avoid duplications in laid-out content fragments. Thus, the content management application 106 also removes nodes from Gr that have an absolute conflict with nodes corresponding to the online content fragments in $XF_{selected}$.

The content management application 106 repeats this process iteratively until $XF \sim = \phi$ or no more grid sections can be selected from within the available grid space. If additional unplaced content fragments do not exist or no layout sections are available, the process involves outputting the content layout with the distributed online content fragments in the layout sections, as depicted at block 514. One or more processing devices execute suitable program code (e.g., one or more modules of the content management application 106) to implement block 514.

Executing the content management application 106 causes the processing device to store electronic content that includes the selected content fragments distributed in the selected layout in a suitable non-transitory computer-readable medium. In some embodiments, the content management application 106 transmits the electronic content to one or more user devices 101, one or more consumer devices 103, or both. In additional or alternative embodiments, the content management application 106 transmits data identifying the electronic content and the location of the electronic content to one or more user devices 101, one or more consumer devices 103, or both. In these embodiments, the content management application 106 transmits the relevant data by configuring one or more network interface devices to transmit the data to a client device (e.g., a user device 101, a consumer device 103, etc.) via a data network 102.

Experimentation Examples for Arranging Online Content Fragments for Presentation Based on Content-Specific Metrics and Inter-Content Constraints.

In experiments involving certain embodiments described herein, a dataset of food-based content fragments was used for a content provider of different food products and services. The experiment involved 5000 content fragments of different types (e.g., articles, videos, profiles, etc.). In the experiment's dataset, each content fragment had a title and a short description that determined the content affinities for defining the conflicts graph. Content-specific metrics (e.g., ad revenue) were attributed to the set XF of content fragment by sampling from a Poisson distribution. An example of a set 600 of input content fragments for the experiment is depicted in FIG. 6.

In this example, starting with a set of 103 content fragments that matched the query "cake," a subset of size 15 (i.e., the set 600) was created using via a Maximum Marginal Relevance ("MMR") algorithm. An example of an MMR is described in Carbonell et al., "The Use of MMR, Diversity-Based Reranking for Reordering Documents and Producing Summaries," Proc. 21st Ann. Intl ACM SIGIR Conf. on Research and Development in Information Retrieval, ACM, pp. 335-336 (1998), which is incorporated by reference herein. The MMR algorithm simultaneously optimized for the largest content-specific metric and ensured a diversity of the content. (In some embodiments, such a set of content fragments can alternatively be obtained from the bundling process described above with respect to FIG. 2.)

Figure 7:
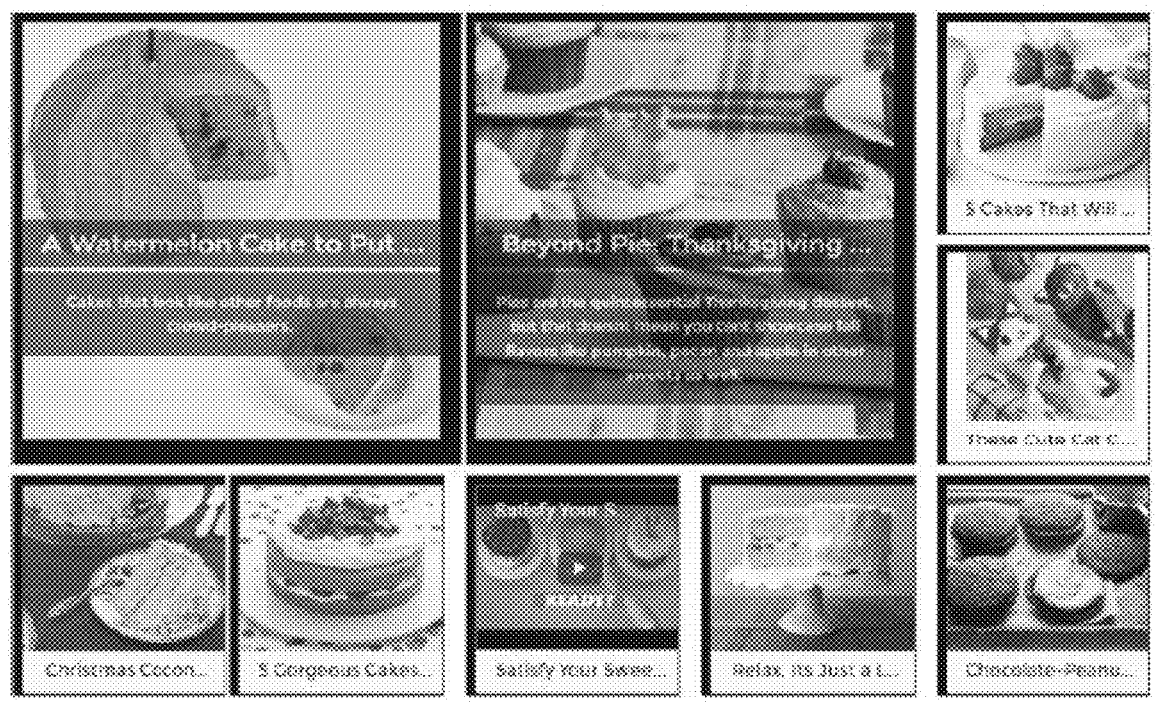
FIG. 7 depicts an example of a resulting distribution of the input content fragments from FIG. 6 using the process depicted in FIG. 5, according to certain embodiments of the present disclosure.

FIG. 7 depicts the subset 700 that was considered for the final distribution. The MMR algorithm assigns a profit score to each content fragment indicating the importance of the content fragment to the selected subset. This can be used as the profit indicator in the bin packing. Alternatively, the raw content-specific values can be used for the profit scores as well.

Figure 8:
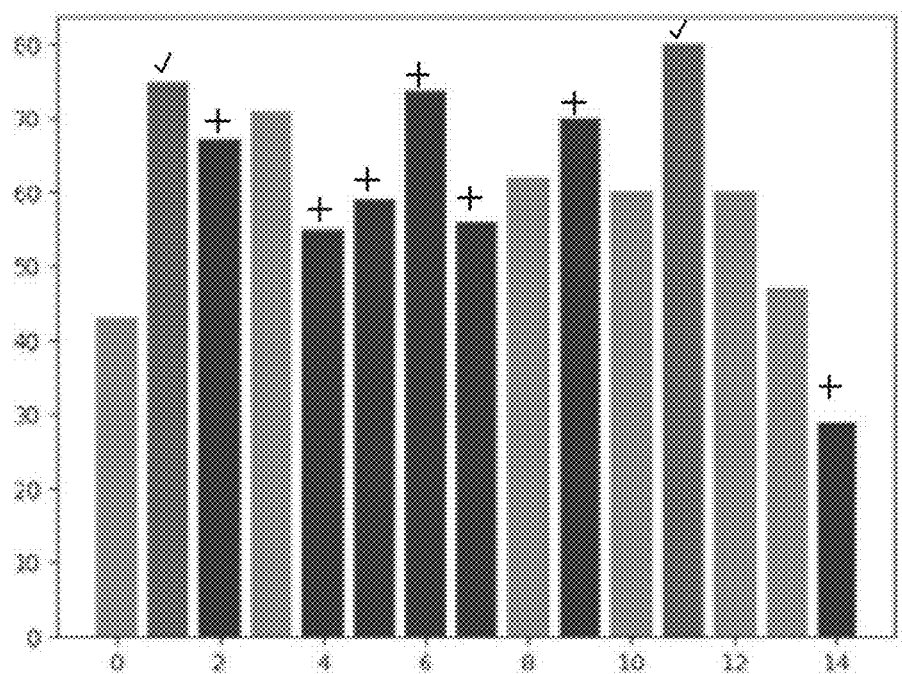
FIG. 8 depicts examples of corresponding content-specific metrics for the distribution of content fragments from FIG. 7, according to certain embodiments of the present disclosure.
Figure 9:
FIG. 9 depicts an example of a random distribution of the content fragments from FIG. 6.
Figure 10:
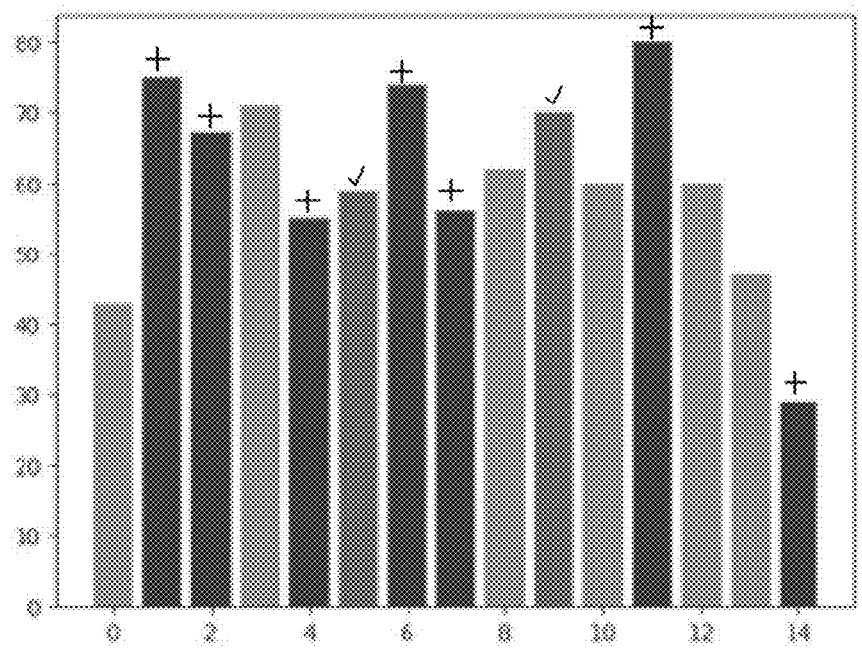
FIG. 10 depicts examples of corresponding content-specific metrics for the distribution of content fragments from FIG. 9.
Figure 11:
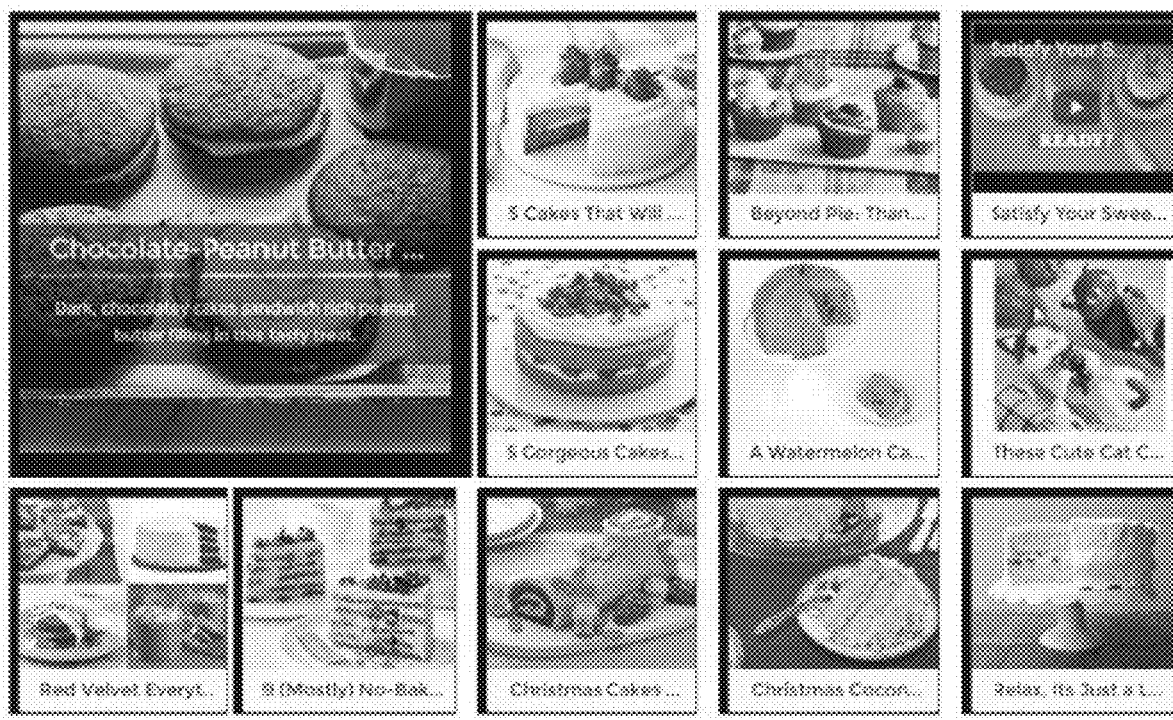
FIG. 11 depicts another example of a random distribution of the content fragments from FIG. 6.
Figure 12:
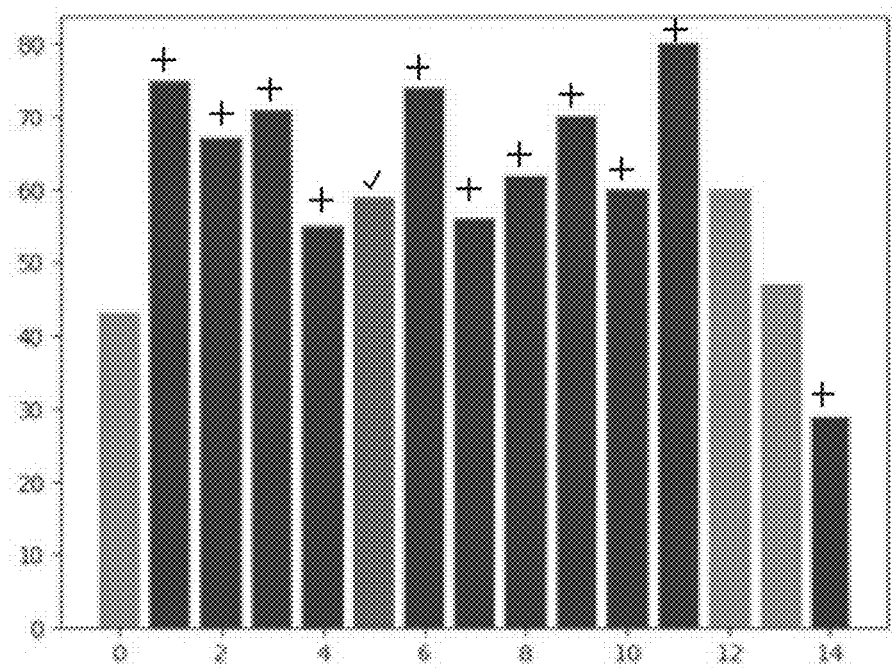
FIG. 12 depicts examples of corresponding content-specific metrics for the distribution of content fragments from FIG. 11.

These content fragments were distributed on a grid layout of dimension 3×5. The content management application was used to decide the position and size of the content fragments in the grid layout. FIG. 7 depicts the resulting distribution of the subset 700 using the process 500 described above. The corresponding content-specific metrics are depicted in the bar graph of FIG. 8. By contrast, FIG. 9 depicts a random distribution of the same set of content fragments on the grid, with the corresponding content-specific metrics are depicted in the bar graph of FIG. 10. FIG. 11 depicts another random distribution of the same set of content fragments on the grid, while the corresponding content-specific metrics are depicted in the bar graph of FIG. 12. In FIGS. 8, 10, and 12, the bars with check marks over them indicate a decision to use a larger fragment, since the fragment has been identified as more important. The bars with plus signs over them indicate standard fragment sizes. The other bars correspond to the content fragments that were not selected for the final rendition due to lack of space in the grid layout.

In this experiment, the content fragment distribution also accounts for inter-content affinities that determine the content that go well together. Therefore, a strict ranking using only content-specific metrics (i.e., without accounting for inter-content affinities or other inter-content constraints) would not yield an optimal distribution of content fragments within a layout. Further, the random distribution forced a pre-selection of a variant for a given fragment before deciding on the distribution of fragments. Thus, the cumulative value of the content-specific revenue (e.g., ad revenue) is greater using embodiments described herein (e.g., the distribution in FIG. 7) as compared to a random distribution (e.g., the distributions in FIGS. 9 and 11).

Figure 13:
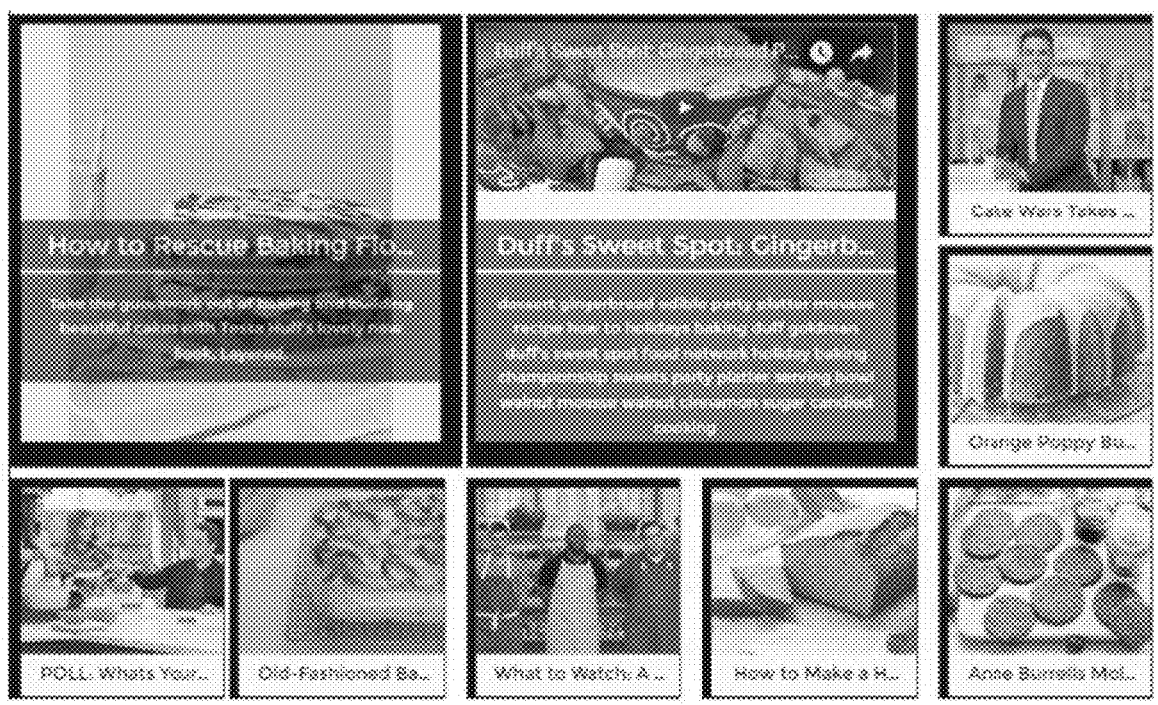
FIG. 13 depicts another example of a distribution of content fragments, according to certain embodiments of the present disclosure.
Figure 14:
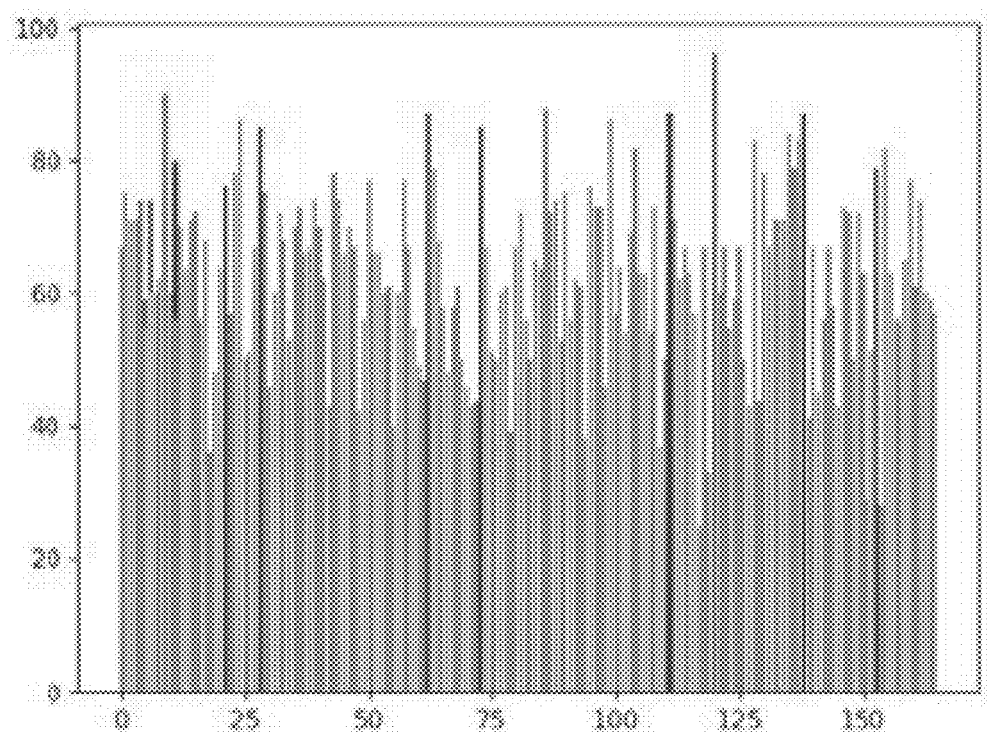
FIG. 14 depicts examples of content-specific metrics for the distribution depicted in FIG. 13, according to certain embodiments of the present disclosure.

The embodiments described herein are scalable to large numbers of candidate fragments (e.g., hundreds of fragments), which would impose significant costs for selection. The embodiments described herein can handle such scale because these embodiments lack restrictions on the size of the fragment set. For example, FIG. 13 depicts a distribution in the same 3×5 grid layout using a set of 166 fragments that matched a query "cake for holidays." FIG. 14 depicts a distribution of content-specific metrics for the example depicted in FIG. 13.

Example of a Computing System for Bundling or Arranging Online Content Fragments for Presentation Based on Content-Specific Metrics and Inter-Content Constraints.

Figure 15:
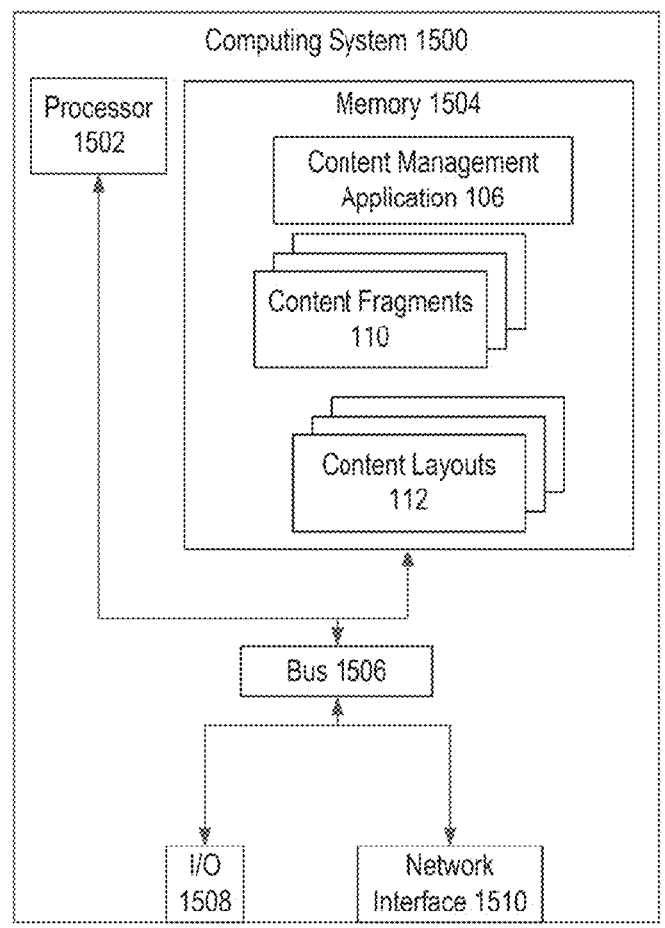
FIG. 15 depicts an example of a computing system that executes a content management application, according to certain embodiments of the present disclosure.

Any suitable computing system or group of computing systems can be used for performing the operations described herein. For example, FIG. 15 depicts an example of a computing system 1500 that executes a content management application 106.

The depicted examples of a computing system 1500 includes a processor 1502 communicatively coupled to one or more memory devices 1504. The processor 1502 executes computer-executable program code stored in a memory device 1504, accesses information stored in the memory device 1504, or both. Examples of the processor 1502 include a microprocessor, an application-specific integrated circuit ("ASIC"), a field-programmable gate array ("FPGA"), or any other suitable processing device. The processor 1502 can include any number of processing devices, including a single processing device.

The memory device 1504 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 1500 may also include a number of external or internal devices, such as input or output devices. For example, the computing system 1500 is shown with one or more input/output ("I/O") interfaces 1508. An I/O interface 1508 can receive input from input devices or provide output to output devices. One or more buses 1506 are also included in the computing system 1500. The bus 1506 communicatively couples one or more components of a respective one of the computing system 1500.

The computing system 1500 executes program code that configures the processor 1502 to perform one or more of the operations described herein. The program code includes, for example, the content management application 106 or other suitable applications that perform one or more operations described herein. The program code may be resident in the memory device 1504 or any suitable computer-readable medium and may be executed by the processor 1502 or any other suitable processor. In some embodiments, the content management application 106, the content fragments 150, and one or more content layouts 152 are stored in the memory device 1504, as depicted in FIG. 15. In additional or alternative embodiments, one or more of the content management application 106, the content fragments 150, and the content layouts 152 are stored in different memory devices of different computing systems.

The computing system 1500 also includes a network interface device 1510. The network interface device 1510 includes any device or group of devices suitable for establishing a wired or wireless data connection to one or more data networks. Non-limiting examples of the network interface device 1510 include an Ethernet network adapter, a modem, and the like. The computing system 1500 is able to communicate with one or more other computing devices (e.g., user devices 101) via a data network using the network interface device 1510.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method performed by one or more processing devices for bundling, based on content-specific metrics and inter-content constraints, content fragments for presentation as online content, the method comprising:
   computing, for candidate content fragments, a set of minimum contribution values based on a set of content-specific metrics and a set of maximum contribution values based on the set of content-specific metrics;
   selecting, based on the sets of minimum and maximum contribution values, a subset of the candidate content fragments;

identifying values associated with the subset of the candidate content fragments, the values comprising a respective value of a reward for each candidate content fragment;

optimizing, subject to an inter-content constraint, a bundle-selection function of the values associated with the subset of the candidate content fragments to select a bundle of online content fragments from the subset of the candidate content fragments;

generating a customized web page comprising the bundle of online content fragments, wherein generating the customized web page comprises:

dividing the customized web page into a grid comprising grid sections;

identifying pairs of online content fragments in the bundle of online content fragments;

computing a respective conflict weight for each pair of online content fragments in the pairs, wherein the respective conflict weight of each pair indicates a degree of similarity or difference between online content fragments in the pair;

constructing a first conflict graph comprising (i) nodes representing the online content fragments in the bundle of online content fragments and (ii) edges representing the respective conflict weights for the pairs of online content fragments, wherein each edge of the first conflict graph has a weight corresponding to the respective conflict weight of the pair of online content fragments represented by adjacent nodes of the edge;

constructing a second conflict graph based on the first conflict graph, wherein the second conflict graph comprises the nodes and a subset of the edges, wherein the subset of the edges comprises those of the edges having respective weights exceeding a threshold; and arranging the bundle of online content fragments in a grid section, of the grid sections of the customized web page, by solving a knapsack problem, wherein solving the knapsack problem comprises excluding at least one online content fragment per pair from each pair of online content fragments representing nodes that are adjacent in the second conflict graph; and causing display of the customized web page via a user device to enable the user device to interact with the bundle of online content fragment arranged in the grid section of the customized web page.

2. The method of claim 1, wherein the inter-content constraint comprises a threshold amount of similarity or diversity among the subset of the candidate content fragments, wherein the method further comprises computing a similarity or diversity among a pair of candidate content fragments from a Euclidean distance between a pair of vector representations corresponding to the pair of candidate content fragments.

3. The method of claim 1, wherein the bundle-selection function comprises an objective function having a first term corresponding to the set of content-specific metrics and a second term corresponding to (i) a reward associated with the inter-content constraint or (ii) a penalty associated with the inter-content constraint, wherein applying the bundle-selection function comprises maximizing the bundle-selection function using values of the set of content-specific metrics for the bundle of online content fragments and values of the inter-content constraint for the bundle of online content fragments.

4. The method of claim 1, wherein generating the customized web page further comprises:

updating the second conflict graph by removing a subset of nodes corresponding to the grid section; and arranging the bundle of online content fragments in an additional grid section of the grid sections based on the second conflict graph as updated.

5. The method of claim 1, wherein arranging the bundle of online content fragments in the grid section further comprises arranging distributing a subset of the bundle of online content fragments in the grid section such that a Steinberg inequality is satisfied, the Steinberg inequality having the subset of the bundle of online content fragments as input rectangles and the grid section as an input grid.

6. The method of claim 1, wherein the set of content-specific metrics comprises one or more of a specified interaction with an online service, an amount of time that a user accesses the online service, and an amount of revenue generated by the user accessing an online service.

7. The method of claim 1, wherein solving the knapsack problem includes consideration of a dimension constraint imposed by the grid section.

8. A system comprising:

a processing device; and a non-transitory computer-readable medium communicatively coupled to the processing device, wherein the processing device is configured to execute program code stored in the non-transitory computer-readable medium and thereby perform operations comprising:

computing, for candidate content fragments, respective minimum contribution values based on a set of content-specific metrics and respective maximum contribution values based on the set of content-specific metrics, selecting, based on the sets of minimum and maximum contribution values, a subset of the candidate content fragments;

identifying values associated with the subset of the candidate content fragments, the values comprising a respective value of a reward for each candidate content fragment;

optimizing, subject to an inter-content constraint, a bundle-selection function of the values associated with the subset of the candidate content fragments to select a bundle of online content fragments from the subset of the candidate content fragments;

generating a customized web page comprising the bundle of online content fragments, wherein generating the customized web page comprises:

dividing the customized web page into a grid comprising grid sections;

identifying pairs of online content fragments in the bundle of online content fragments;

computing a respective conflict weight for each pair of online content fragments in the pairs, wherein the respective conflict weight of each pair indicates a degree of similarity or difference between online content fragments in the pair;

constructing a first conflict graph comprising (i) nodes representing the online content fragments in the bundle of online content fragments and (ii) edges representing the respective conflict weights for the pairs of online content fragments, wherein each edge of the first conflict graph has a weight corresponding to the respective conflict weight of the pair of online content fragments represented by adjacent nodes of the edge;

constructing a second conflict graph based on the first conflict graph, wherein the second conflict graph comprises the nodes and a subset of the edges, wherein the subset of the edges comprises those of the edges having respective weights exceeding a threshold; and arranging the bundle of online content fragments in a grid section, of the grid sections of the customized web page, by solving a knapsack problem, wherein solving the knapsack problem comprises excluding at least one online content fragment per pair from each pair of online content fragments representing nodes that are adjacent in the second conflict graph; and causing display of the customized web page via a user device to enable the user device to interact with the bundle of online content fragment arranged in the grid section of the customized web page.

9. The system of claim 8, wherein the inter-content constraint comprises a threshold amount of similarity or diversity among the subset of the candidate content fragments, wherein the operations further comprise computing a similarity or diversity among a pair of candidate content fragments from a Euclidean distance between a pair of vector representations corresponding to the pair of candidate content fragments.

10. The system of claim 8, wherein the bundle-selection function comprises an objective function having a first term corresponding to the set of content-specific metrics and a second term corresponding to (i) a reward associated with the inter-content constraint or (ii) a penalty associated with the inter-content constraint, wherein applying the bundle-selection function comprises maximizing the bundle-selection function using values of the set of content-specific metrics for the bundle of online content fragments and values of the inter-content constraint for the bundle of online content fragments.

11. The system of claim 8, wherein generating the customized web page further comprises:

updating the second conflict graph by removing a subset of nodes corresponding to the grid section; and arranging the bundle of online content fragments in an additional grid section of the grid sections based on the second conflict graph as updated.

12. The system of claim 8, wherein arranging the bundle of online content fragments in the grid section further comprises arranging distributing a subset of the bundle of online content fragments in the grid section such that a Steinberg inequality is satisfied, the Steinberg inequality having the subset of the bundle of online content fragments as input rectangles and the grid section as an input grid.

13. The system of claim 8, wherein the set of content-specific metrics comprises one or more of a specified interaction with an online service, an amount of time that a user accesses the online service, and an amount of revenue generated by the user accessing an online service.

14. The system of claim 8, wherein solving the knapsack problem includes consideration of a dimension constraint imposed by the grid section.

15. A non-transitory computer-readable medium having program code that is stored thereon and that is executable by a processing device for performing operations, the operations comprising:

a step for computing, for candidate content fragments, respective minimum contribution values based on a set of content-specific metrics and respective maximum contribution values based on the set of content-specific metrics;

a step for selecting, based on the sets of minimum and maximum contribution values, a subset of the candidate content fragments;

a step for identifying values associated with the subset of the candidate content fragments, the values comprising a respective value of a reward for each candidate content fragment;

a step for optimizing, subject to an inter-content constraint, a bundle-selection function of the values associated with the subset of the candidate content fragments to select a bundle of online content fragments from the subset of the candidate content fragments;

a step for generating a customized web page comprising the bundle of online content fragments, wherein generating the customized web page comprises:

dividing the customized web page into a grid comprising grid sections;

identifying pairs of online content fragments in the bundle of online content fragments;

computing a respective conflict weight for each pair of online content fragments in the pairs, wherein the respective conflict weight of each pair indicates a degree of similarity or difference between online content fragments in the pair;

constructing a first conflict graph comprising (i) nodes representing the online content fragments in the bundle of online content fragments and (ii) edges representing the respective conflict weights for the pairs of online content fragments, wherein each edge of the first conflict graph has a weight corresponding to the respective conflict weight of the pair of online content fragments represented by adjacent nodes of the edge;

constructing a second conflict graph based on the first conflict graph, wherein the second conflict graph comprises the nodes and a subset of the edges, wherein the subset of the edges comprises those of the edges having respective weights exceeding a threshold; and arranging the bundle of online content fragments in a grid section, of the grid sections of the customized web page, by solving a knapsack problem, wherein solving the knapsack problem comprises excluding at least one online content fragment per pair from each pair of online content fragments representing nodes that are adjacent in the second conflict graph; and a step for causing display of the customized web page via a user device to enable the user device to interact with the bundle of online content fragments arranged in the grid section of the customized web page.

16. The non-transitory computer-readable medium of claim 15, wherein the inter-content constraint comprises a threshold amount of similarity or diversity among the subset of the candidate content fragments, wherein the operations further comprise a step for computing a similarity or diversity among a pair of candidate content fragments from a Euclidean distance between a pair of vector representations corresponding to the pair of candidate content fragments.

17. The non-transitory computer-readable medium of claim 15, wherein the bundle-selection function comprises an objective function having a first term corresponding to the set of content-specific metrics and a second term corresponding to (i) a reward associated with the inter-content constraint or (ii) a penalty associated with the inter-content constraint, wherein the step for applying the bundle-selection function comprises maximizing the bundle-selection function using values of the set of content-specific metrics for the bundle of online content fragments and values of the inter-content constraint for the bundle of online content fragments.

18. The non-transitory computer-readable medium of claim 15, wherein generating the customized web page further comprises:
   updating the second conflict graph by removing a subset of nodes corresponding to the grid section; and
   arranging the bundle of online content fragments in an additional grid section of the grid sections based on the second conflict graph as updated.

19. The non-transitory computer-readable medium of claim 15, wherein arranging the bundle of online content fragments in the grid section further comprises arranging distributing a subset of the bundle of online content fragments in the grid section such that a Steinberg inequality is satisfied, the Steinberg inequality having the subset of the bundle of online content fragments as input rectangles and the grid section as an input grid.

20. The non-transitory computer-readable medium of claim 15, wherein solving the knapsack problem includes consideration of a dimension constraint imposed by the grid section.

\* \* \* \* \*